United States Patent

Keck et al.

Patent Number: 5,431,984
Date of Patent: Jul. 11, 1995

[54] COMPOSITE PREFORMS WITH GROVES FOR FIBERS AND GROVES FOR OFF-GASSING

[75] Inventors: Steven D. Keck, Hockessin, Del.; Harlan L. Woods, Wakefield, Mass.

[73] Assignee: Avco Corporation, Providence, R.I.

[21] Appl. No.: 625,479

[22] Filed: Dec. 11, 1990

[51] Int. Cl.⁶ .................. B23K 20/22; B32B 15/14
[52] U.S. Cl. .................................. 428/175; 428/37; 428/65.9; 428/67; 428/174; 428/181; 428/182; 428/220; 428/224; 428/457; 428/604; 428/246; 29/419.1; 156/169; 156/252
[58] Field of Search ................... 428/37, 64, 65, 225, 428/246, 67, 174, 5, 181, 182, 220.4, 457, 604; 156/169, 252; 29/419.1

[56] References Cited

U.S. PATENT DOCUMENTS

| 3,419,952 | 1/1969 | Carlson | 29/471.3 |
| 3,936,550 | 2/1976 | Carlson et al. | 428/294 |
| 4,217,157 | 8/1980 | Stoltze et al. | 156/87 |
| 4,697,324 | 10/1987 | Grant et al. | 29/419 R |

FOREIGN PATENT DOCUMENTS

| 2607071 | 11/1987 | France . | |
| 2168032 | 6/1986 | United Kingdom | B65H 55/00 |

Primary Examiner—Patrick J. Ryan
Assistant Examiner—Richard C. Weisberger
Attorney, Agent, or Firm—Abraham Ogman; Edmund J. Walsh; Mary E. Porter

[57] ABSTRACT

The invention is directed to composite preforms which comprise reinforcing fiber deposited in grooves preformed in a metal or ceramic foil.

14 Claims, 3 Drawing Sheets

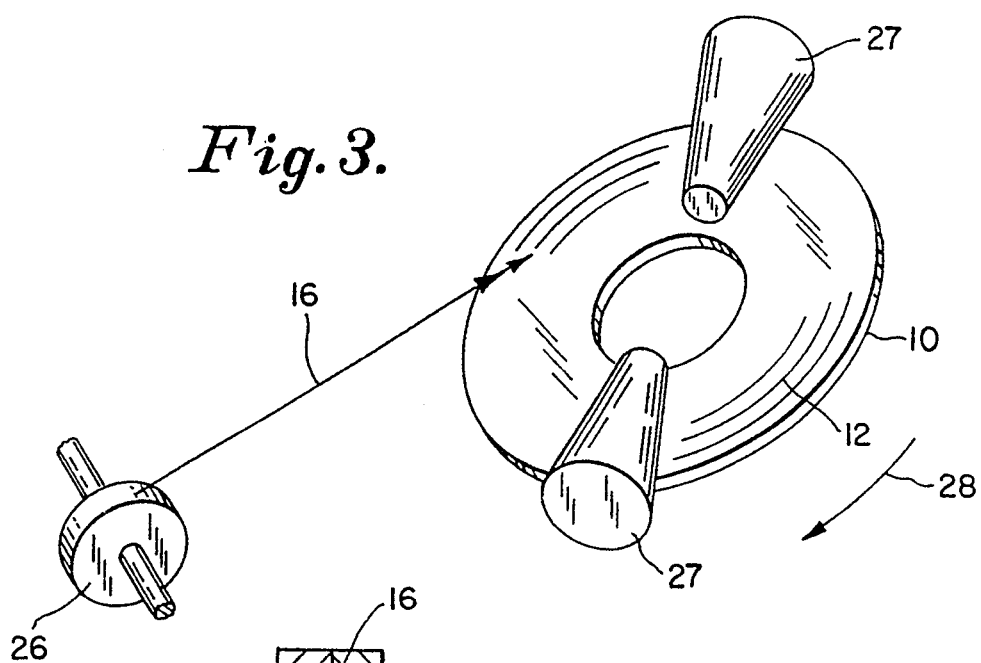
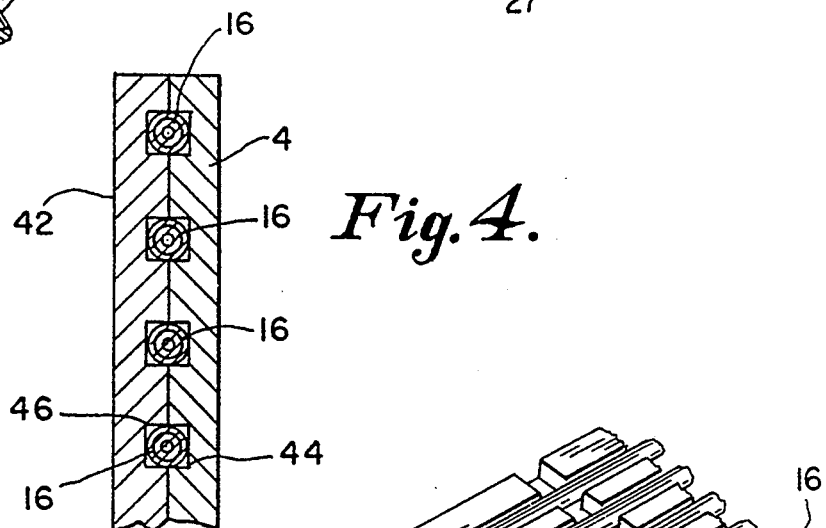
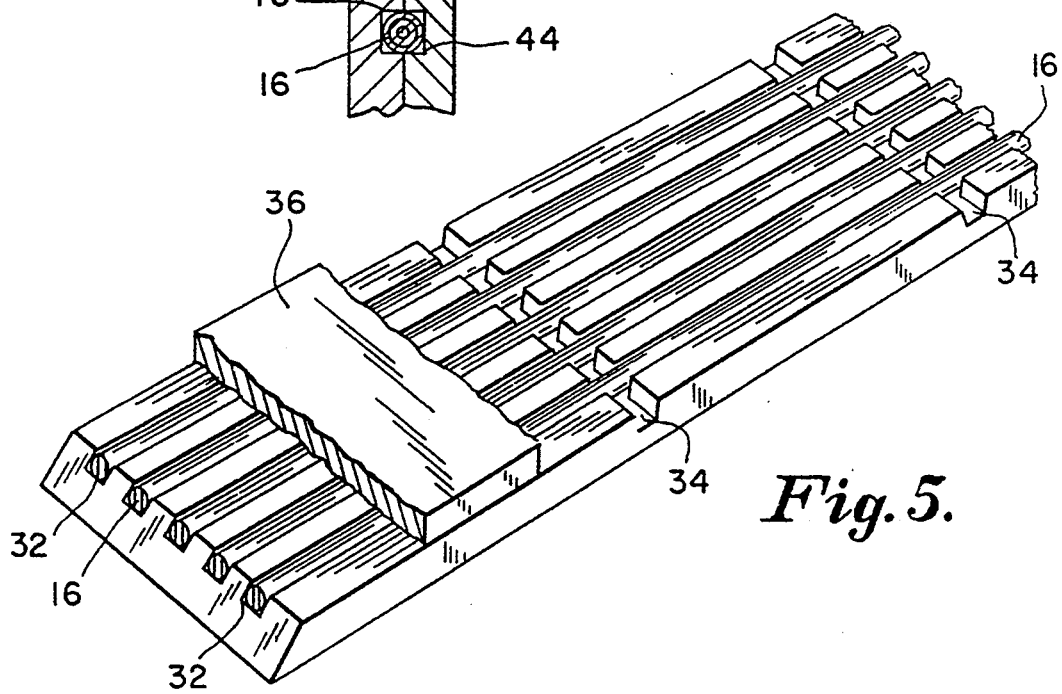

COMPOSITE PREFORMS WITH GROVES FOR FIBERS AND GROVES FOR OFF-GASSING

The invention is directed to composite preform modules, composite preforms, and processes for converting the modules and preforms into composite structures and composite materials.

For purposes of this discussion a composite preform is defined as a matrix material having distributed therein reinforcing filaments. The matrix material is configured to be consolidated with other preforms into a composite module, or composite structure.

A composite module is defined as a monolayer preform, or a multilayer preform which is shaped and ready to be consolidated.

Composite materials and composite structures are in widespread use in aerospace structures, sporting goods, jet engines, and all manner of applications where materials having a high strength to weight ratio is desired.

There are several methods currently utilized for making fiber reinforced metal composite rings, disks, and shaped structures. One method of making reinforced rings or disks is to first make a unidirectional composite monolayer tape having a width equal to the maximum height of the desired rings. The strip is rolled into a ring having a desired inside and outside diameter.

Alternatively, a ring is formed by co-winding a tape of dry fiber (held together with a cross weave of metal ribbon) with a strip of metal. The thus-formed ring is then consolidated using either internal or external radial pressure, that is, pressure is applied to the strip surface.

In this first method, as the fibers and metal are wound into an assembly of cylindrical layers, the coiled package requires the application of pressure in the radial direction so as to effectively flow the metal and consolidate the composite without distorting the fiber winding pattern. Applying pressure radially inwards or outwards, however, either buckles or breaks the fiber thereby distorting the ring and reducing the properties of the composite.

A second method requires the co-winding of a single filament and a metal ribbon into a groove mandrel to form a continuous in-plane spiral of fibers separated by metal. See U.S. Pat. No. 4,697,324 dated Oct. 6, 1987. This assembly is then consolidated by applying pressure on the direction parallel to the axis of the shape thus overcoming the concern for fiber distortion, fiber breakage, or fiber buckling that result from radially consolidating the coiled package described in the first method.

Spirally winding single fibers together with a metal ribbon into a deep groove in a mandrel is difficult and can result in an irregular fiber/ribbon pattern that is not conducive to high material properties.

For improvement upon the second, a third method utilizes a helical wound tape of filaments held together with a cross-weave of metallic ribbon and metallic foil of the same configuration. The two helical tapes are interleaved to form a helical assembly having turns of filaments alternating with turns of metallic foil. As in the second method, this assembly is then consolidated by applying pressure in the direction parallel to the axis of the shape.

This method utilizes a woven tape containing a multitude of fibers that all terminate at one location causing an area of stress intensity. Experience has shown that the cross weave ribbon does not completely hold each fiber separate from its neighbor, resulting in possible unconsolidated void areas and resultant poor mechanical properties. Also, an irregular width tape is required to shape the profile of a disk. This is costly to produce and difficult to control during assembly.

Yet a fourth method utilizes a spiral winding of fibers similar to that described in the second method. In this case, however, the fibers are held in position and spaced apart by a cross weave of metallic ribbons placed in the radial direction. This spirally wound preform is then interleaved with metal foil and consolidated by applying pressure in the axial direction.

STATEMENT OF INVENTION

Unlike the previous described methods which were primarily suited for metal matrix construction, the present invention also lends itself to making ceramic composite preforms and modules and structures. The invention will be described, however, primarily in terms of a metal foil matrix.

A metal foil composite preform comprises a metal foil with a groove having a predetermined depth and width. A continuous length of fiber is placed in the groove. There is also provided off-gassing means to permit gas to escape from the groove. The preform may take the shape of a ring or disk with the groove being archimedean spiral. Alternately the preform may be a ribbon with a number of grooves defined therein.

The invention also comprises a process for making a multi-layered composite structure which calls for superimposing a plurality of the metal foil composite preforms configured to a desired shape and consolidating the preforms under heat and pressure to form a fully dense composite material or structure.

OBJECTS OF THE INVENTION

It is the object of the invention to provide a metal foil composite preform which may be used to make metal matrix composite materials and structures.

It is another object of the invention to provide a ceramic matrix composite preform which may be used to make ceramic matrix materials and structures.

It is an object of the invention to provide a composite preform which can be consolidated axially without distorting the fibers.

It is another object of the invention to provide a composite preform where the fibers will not terminate in a concentrated area.

It is yet another object of the invention to provide a composite preform where a shaped disk can be made by varying the positioning of the fibers for each individual preform.

It is still another object of the invention to provide a composite preform in the shape of a straight or curved ribbon that retains all of the advantages and improvements cited above.

It is a further object of the invention to provide a process for making shaped structures by laying up composite preforms into a desired shape having predetermined properties and consolidating the preforms.

The novel features that are considered characteristic of the invention itself, however, both as to its organization and method of operation, together with additional objects and advantages thereof, will best be understood from the following description of a specific embodiment, when read in conjunction with the accompanying drawings, in which:

FIG. 3 is a schematic representation of a method of making a composite preform in the shape of a disk;

FIG. 4 is an alternate way of constructing a composite disk using a split plate;

FIG. 5 is a composite preform in the form of straight ribbon;

DESCRIPTION OF THE INVENTION

Figure 1:
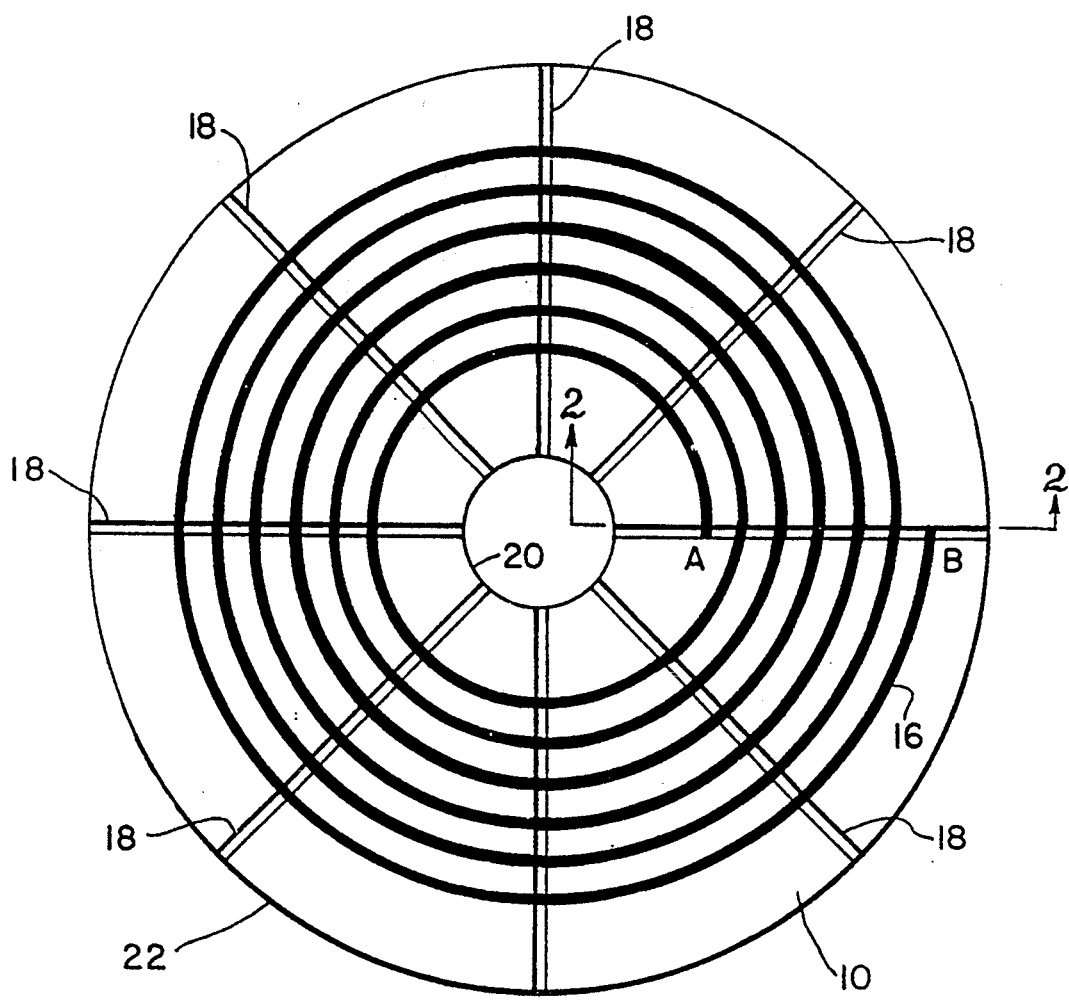
FIG. 1 is a top view of a composite preform in shape of a disk.
Figure 2:
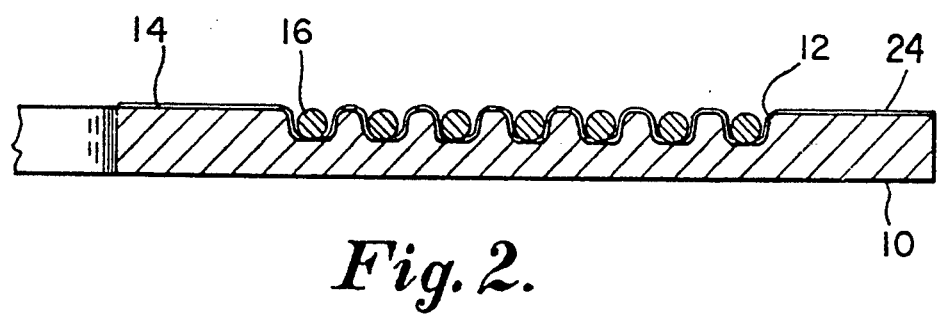
FIG. 2 is a view taken along line 2—2 of FIG. 1.

In its most primitive form there is shown in FIGS. 1 and 2 a foil composite preform where a spirally wound preform is achieved by winding the fiber reinforcement 10 to grooves formed in a foil made from aluminum, titanium, aluminides, or any metal or alloy commonly used to make composite materials and structures, As best seen in FIG. 2 the disk 10 comprising a metal foil having a spiral groove 12 defined in one surface 14 of the foil within the groove is positioned a fiber reinforcement 16. The disk 10 also contains a plurality of radially directed grooves 18 used for off-gassing the preform during consolidation.

The type of fiber reinforcement 16 is not critical. The fiber reinforcement 16 may be carbon, boron, silicon carbide, titanium diboride and the like. The form of the fiber reinforcement 16 may be in the form of a tow or a monofilament.

Currently and preferably a silicon carbide monofilament within a titanium foil is the preferred combination.

Referring to FIG. 1 the groove 12 containing the fiber reinforcement 16 begins at a specified polar coordinate "A" and rotates through a number of complete 360 degree revolutions. The spiral ends at a final polar coordinate "B" having the same angular position as the initial polar coordinate. Where one desires an archimedean spiral, a constant incremental radial increase per each 360 degree revolution is structured.

Also included are a number of linear grooves 18 which extend radially outward from the inside diameter 20 of the disk 10 to the outside diameter 22. The linear radial grooves 18 allow for off-gassing or removal of a fugitive resin binder 24 (see FIG. 2) that is provided to temporarily hold the fiber within the groove before and during the consolidation process that will follow. The preferred fugitive binder is acrylic resin. Acrylic resin leaves no residue when it is vaporized. Other means of holding the fiber in place are a plasma sprayed overcoating or vacuum applied through holes in the face.

The spiral groove 12 provides a constant and equal radial spacing for a single continuous fiber 16 that is placed in the groove 12. The spiral groove geometry is such that it will maintain a radial spacing, determined by the groove design configuration between consecutive revolutions at all points along the entire length of the in-plane spiral filament.

Referring to FIG. 3 there is a schematic representation of one way to construct preform in the shape of a washer. The fiber 16 is taken from a spool 26 and placed into the groove 12 where it is bonded by acrylic or other suitable bond—not shown. The disk 10 is slowly rotated in the direction of the arrow 28. The fiber 16 is fed into the groove 12 and under the rollers 27. The rollers maintain the fiber within the groove until the bond is applied.

FIG. 4 shows an assembly formed from two thin foils 40 and 42 that have shallow groove configurations 44 and 46 that are mirror images of each other. This can be used with thin foil to provide higher fiber volume or foil thickness if needed.

Figure 7A:
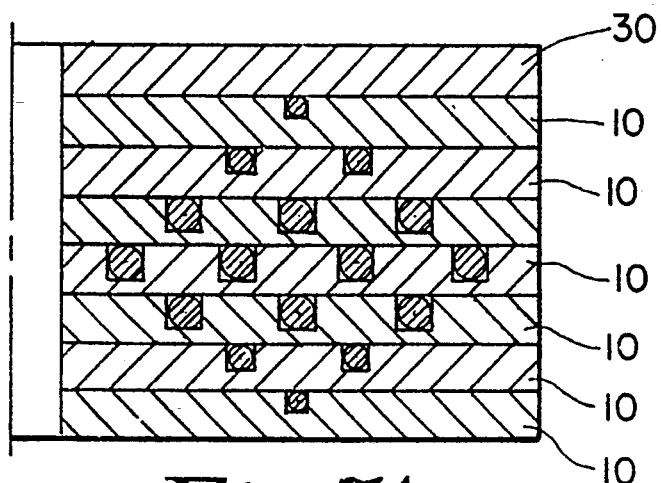
FIG. 7 shows a plurality of ring preforms positioned for consolidation.

Referring to FIG. 7A there is shown a plurality of monolayered preforms 10 concentrically placed one on top of another. A foil 30 is placed over the top preform 10. FIG. 7A illustrates a way of producing a varied cross sectional arangement of reinforcing fibers with a predetermined fiber stacking order. The assembly of preforms 10 is ready for consolidation.

Figure 7B:
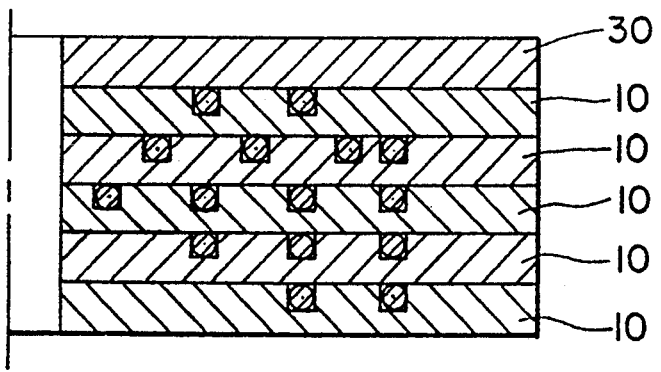

FIG. 7B allows spacing variations of fiber within a composite structure for consolidation condensation.

FIG. 5 shows a ribbon preform where all of the grooves 32 are straight and parallel to one another. Each of the grooves 32 contains a fiber reinforcement 16. A transverse groove 34 is typical for off-gassing during consolidation. The fibers are kept in place by a thin layer of a fugitive binder 36 such as acrylic.

Figure 6:
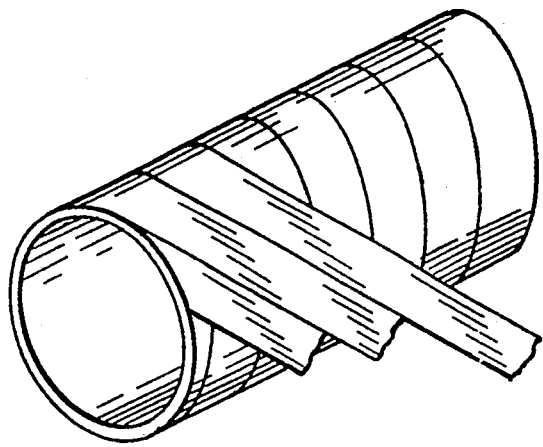
FIG. 6 is a representation of a partial cylindrical tube constructed by laying up ribbon preforms.

FIG. 6 shows a partial representation of a cylindrical tube formed by wrapping layers of ribbon preforms on a mandrel. The composite structure, in this case a composite tube, is formed by consolidating the layers of ribbon.

The preforms described above provide a number of benefits that include: 1) varying the size of the disc I.D. and thickness dimensions as necessary to comply with a final part design, 2) varying the groove depth and width to comply with final part design criteria, and 3) varying the constant incremental radial increase per revolution to comply with the stress or strain requirements of the final part design.

The various features and advantages of the invention are thought to be clear from the foregoing description. Various other features and advantages not specifically enumerated will undoubtedly occur to those versed in the art, as will many variations and modifications of the preferred embodiment illustrated, all of which may be achieved without departing from the spirit and scope of the invention as defined by the claim.

We claim:

1. A composite preform comprising:
foil having an edge and a first groove and a second groove defined therein, said second groove running from said first groove to the edge of the foil; and
filamentary reinforcement positioned within the first groove.

2. Composite preform as defined in claim 1 in which the groove is dimensionally equal in depth and width.

3. A composite preform as defined in claim 1 which includes a fugitive binder holding the filamentary reinforcement in the groove.

4. A composite preform as defined in claim 1 where the filamentary reinforcement is a continuous length.

5. A composite preform defined in claim 1 where the groove is in the shape of an archimedean spiral.

6. The composite preform of claim 1 additionally comprising means for holding the reinforcement within the groove.

7. A composite preform as defined in claim 6 wherein the means for holding the reinforcement in the groove comprises a fugitive binder.

8. The composite preform of claim 1 wherein the foil is annular.

9. A composite preform comprising:

a plurality of foils configured into a predetermined structural shape, each of said foils having a groove defined therein containing fiber reinforcement and off-gassing means comprising a second groove formed in the foil.

10. The composite preform of claim 9 wherein the off-gassing means comprises a plurality of grooves in the foil extending at least from the groove to an edge of the foil.

11. The composite preform of claim 9 wherein each foil is annular and the foils are stacked one on top of the other.

12. The composite preform of claim 9 wherein the grooves in a first portion of the plurality of the foils are shaped differently than the grooves in a second portion of the plurality.

13. A composite preform comprising:
   (a) a foil having a groove defined therein, said groove shaped as an archimedial spiral; and
   (b) a continuous monofilament disposed in said spiral groove.

14. The composite preform of claim 13 wherein the foil has formed therein a plurality of grooves extending radially through the spiral groove.

* * * * *